UNITED STATES PATENT OFFICE.

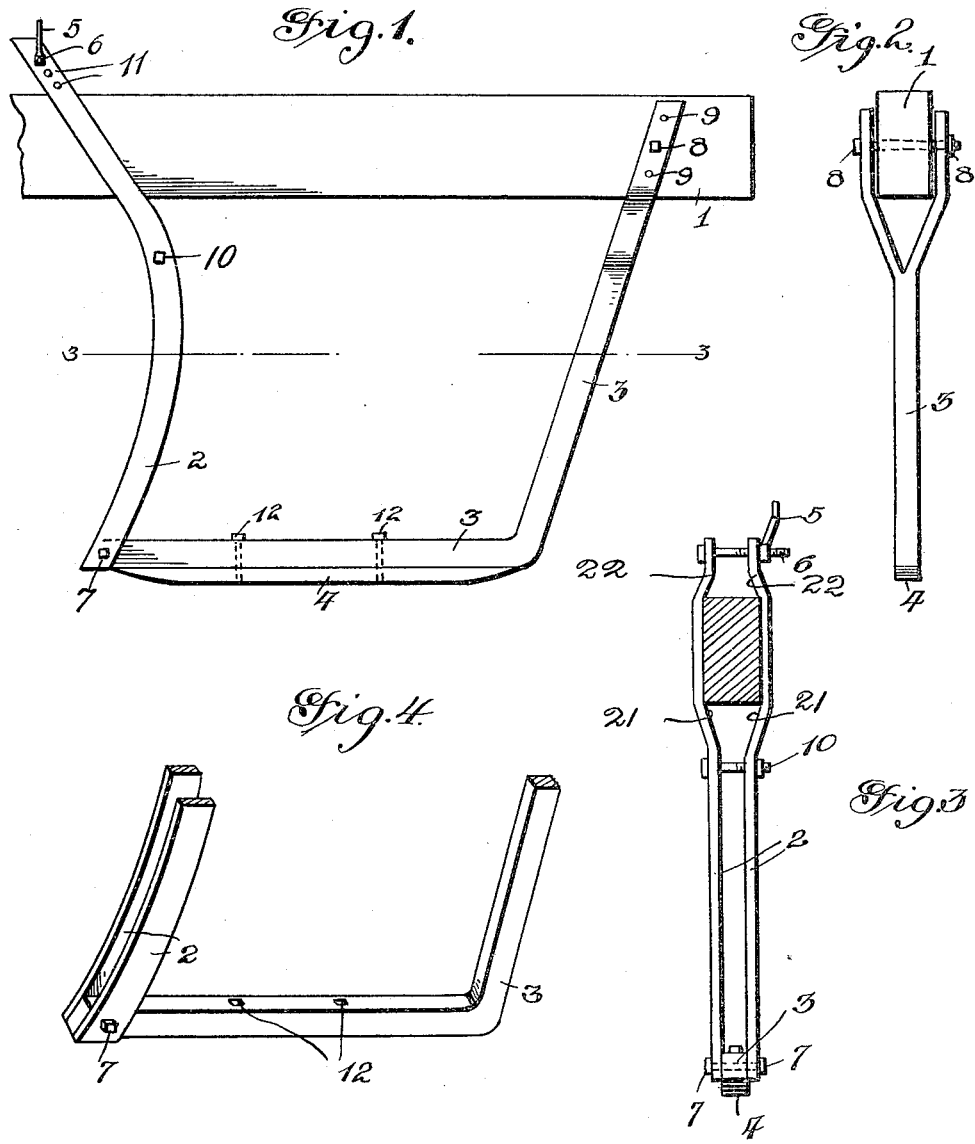

HUGH C. STANTON, OF DILLON, SOUTH CAROLINA.

PLOW.

1,136,448. Specification of Letters Patent. Patented Apr. 20, 1915.

Application filed February 17, 1913. Serial No. 749,004.

*To all whom it may concern:*

Be it known that I, HUGH C. STANTON, a citizen of the United States, residing at Dillon, in the county of Dillon and State of South Carolina, have invented new and useful Improvements in Plows, of which the following is a specification.

My invention relates to plows for making furrows in the land, and its object is to generally improve implements of this kind whether they are used for making a bed for seeds, covering the same, hilling up the earth to crops, laying out lines for planting, or for other purposes.

My invention has for its principal object to improve the construction of the plow shown and described in the patent to W. T. Huggins, No. 782,658.

The particular purpose of my invention is to provide a construction whereby the digging action of the plow may be varied while still preserving a uniform depth of the furrow.

Other objects and the novel features of my invention will be apparent from the following description taken in connection with the drawing, in which:

Figure 1 is a view showing so much of a plow or cultivator as is necessary to show my invention; Fig. 2 is a rear view of the parts of the plow shown in Fig. 1; Fig. 3 is a front view of the parts of the plow shown in Fig. 1, the beam being shown in section; and Fig. 4 is a perspective view of the lower parts of the plow below the section line 3—3 in Fig. 1.

Referring to the drawing, the numeral 1 designates the plow or cultivator beam and may be provided with the usual handles (not shown) at the rear end.

Numeral 2 designates the front plow standards to which the plow sweep or shovel (not shown) is to be fastened in the usual or any suitable way. The said standard 2 is made of two pieces of iron of the proper size bent into a crescent shape so that the top part of each piece will extend above and forwardly of the beam 1. The two pieces comprising the front standard 2 are so designed that the upper end will always be as far forward as the bottom end of the standard.

The numeral 3 designates a metal member bent at a point intermediate its ends so that one part will be horizontal and the other part will extend upwardly to the beam. The upwardly extending part of the member 3 constitutes the rear standard of the plow while the horizontally extending part constitutes the bottom or runner of the plow to which the slide 4 is fastened. The upwardly extending part or rear standard is bifurcated at the top so as to straddle or embrace the plow beam 1. The arms comprising the bifurcated end of the rear standard are secured to the beam 1 by the bolt 8, the said arms having a series of adjusting holes 9, 9 to receive the bolt which passes therethrough and through a hole in the beam.

The slide or shoe 4 of the plow has two holes therein to receive bolts 12, 12 for securing it to the runner or horizontal portion of the part 3. The holes in the runner and in the slide or shoe are the same distance from each end and so arranged that the slide or shoe may be reversed to allow the shoe to be turned end for end so that the opposite ends can be worn down an equal amount.

The pieces comprising the front standard are bent outwardly as shown in Fig. 3 to provide the shoulders 21 and 22 in each of the pieces. The beam 1 fits between the shoulders and may rest on the shoulders 21, 21. Above the shoulders 22, 22 in the plates comprising the front standard 2 is a series of holes 11 to receive the adjusting bolt 6 which has a lever nut 5 attached thereto so that the front standard can be tightly clamped in place at its adjusted position. Any adjustment of the plow as to forward or backward movement to throw more or less earth may be secured by simply loosening the bolt 6 by operating the lever nut 5 and moving the upper ends of the pieces comprising the standard 2 backward or forward to the desired position and again fastening the front standard in place by turning the lever nut 5.

The pieces comprising the front standard 2 are pivotally connected at their lower end to the front end of the runner portion of the part 3 by means of the bolt 7. In order to more securely clamp the front standard in place I provide a bolt 10 which extends through the pieces comprising the front standard a short distance below the shoulders 21, 21.

The operation of the device will be apparent from the foregoing description. When it is desired to adjust the blade or shovel of the plow which is carried by the front standard 2, the lever nut 5 is unscrewed a few turns and the front part of the standard 2 is moved to any position depending upon the angle and digging position desired and then the standards are fastened by tightening the lever nut 5. As the beam requires no hole or series of holes through it at this point for obtaining any number of adjustments the beam is stronger than it would be with the adjusting holes.

As before mentioned handles are fixed at the rear end of the beam 1 though not shown in the drawing and the beam 1 may be rocked on the bolt 8 as a fulcrum, the bolt 8 being mounted in the arms at the upper end of the rear standard 3 and supported from the surface of the earth. The beam 1 and the rear standard 3 are thus pivotally connected together and with the coöperation of the front standard will maintain the depth of plow constant. It will be noticed that the rear standard, when it is adjusted in place, is freely swingable about a fixed point in the rear standard and in the beam so that it and the beam will assume the proper relation to keep the depth of cut constant. Since the standard 2 is adjustable when the top part is moved forward, it will set the plow point so that it will have a greater digging action, that is, it will be at a greater inclination to the earth. When the upper ends of the bars comprising the front standard are adjusted and moved rearwardly the plow point will be set so as to have a lesser digging action since the inclination of the bars will not be so steep. The variation of the digging action of the plow point will not alter the depth of plowing since the runner part 3 is pivotally connected to the standard and to the beam 1, and is free to assume such a position that the depth will remain constant because the forward end of the beam will be depressed when the upper end of the standard is moved forward and the forward end of the beam will be elevated when the upper end of the standard is moved rearwardly. Thus the depth of plowing will be kept constant by the change in the position of the forward end of the beam.

It will be noticed that the standard of the plow is curved into a crescent shape thereby shedding any trash or litter that may be plowed through.

Having thus described my invention, what I claim as new, and desire to secure by Letters Patent is—

1. In a plow, the combination of a plow beam, a standard having an upper end adjustably connected with the beam, a runner pivotally connected with the foot of said standard and having its rear end pivotally connected with the beam, the runner being freely swingable about a fixed point in the beam and in the rear end of the runner, whereby when the upper end of said standard is moved forwardly the front end of the beam is depressed and when the upper end of said standard is moved rearwardly the front end of the beam is elevated, thus changing the digging action of the plow but preserving the depth uniform.

2. In a plow, the combination of a plow beam, a standard having forwardly curved arms embracing the beam and projecting above the same, an adjusting bolt connecting the arms above the beam, a runner pivotally connected with the foot of the standard, the rear end of said runner extending upwardly and being pivotally connected to the beam by a U-shaped connection, the construction being such that when the arms of the standard are moved forwardly, the front end of the beam will be depressed and when moved rearwardly, the front end of the beam will be elevated thus changing the digging action of the plow but preserving the depth uniform, the runner being freely swingable with relation to the beam about a fixed point in said U-shaped connection and in said beam.

3. In a plow, the combination of a plow beam, a front standard comprising a pair of forwardly curved arms embracing the beam, extending above the same, and each having bolt holes above the beam, an adjusting bolt fitting the bolt holes and connecting the arms above the beam, a device pivotally connected at its forward end to the foot of the front standard and having a horizontal and rearwardly extending part and an upwardly extending part, the rearwardly extending part constituting the runner of the plow, the upwardly extending part constituting the rear standard and being bifurcated at its upper end to embrace the plow beam, means for adjustably connecting the rear standard to said beam comprising bolt holes in each of said parts of the bifurcated portion, and a bolt fitting said last mentioned bolt holes, the upwardly extending part of said device which constitutes the rear standard when adjusted in place being swingable about a fixed point in the rear standard and in the beam of the front standard are moved forwardly the front of the plow beam will be depressed, and when the said arms are moved rearwardly the front of the beam will be elevated thereby changing the digging action of the plow, but preserving the depth uniform.

4. In a plow, the combination of a plow beam, a front standard comprising a pair of forwardly curved arms having bent parts near their upper ends providing shoulders to engage the lower edge of said beam, said arms extending above the beam and each having bolt holes in the part thereof above the beam, an adjusting bolt fitting the bolt holes and capable of clamping the arms together to secure the front standard to the beam, a bolt capable of fastening the arms together below the beam and below the lower shoulders of said arms, a device pivotally connected at its forward end to the foot of the front standard and having a horizontal part constituting a runner and an upwardly extending part constituting the rear standard, the said upwardly extending part being bifurcated at its upper end to embrace the plow beam and pivotally connected to said beam and swingable about a fixed point in the rear standard and in the beam, for the purpose described.

In testimony whereof I have signed this specification in the presence of two subscribing witnesses.

HUGH C. STANTON.

Witnesses:
 LEON ISEMAN,
 E. P. MOBLEY, Jr.

Copies of this patent may be obtained for five cents each, by addressing the "Commissioner of Patents, Washington, D. C."